(12) United States Patent
Shaffer et al.

(10) Patent No.: US 8,341,663 B2
(45) Date of Patent: Dec. 25, 2012

(54) FACILITATING REAL-TIME TRIGGERS IN ASSOCIATION WITH MEDIA STREAMS

(75) Inventors: Shmuel Shaffer, Palo Alto, CA (US); Mukul Jain, San Jose, CA (US); Labhesh Patel, San Francisco, CA (US); Sanjeev Kumar, San Francisco, CA (US); Sravan Vadlakonda, Sunnyvale, CA (US); Arthur Gerald Howarth, Orleans (CA); Ashish P. Chotai, West Des Moines, IA (US); Aseem Asthana, San Jose, CA (US); Rajneesh Kumar, San Jose, CA (US); Shantanu Sarkar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 653 days.

(21) Appl. No.: 11/870,406

(22) Filed: Oct. 10, 2007

(65) Prior Publication Data

US 2009/0100468 A1 Apr. 16, 2009

(51) Int. Cl.
*H04N 7/10* (2006.01)
*H04N 7/025* (2006.01)

(52) U.S. Cl. ............ 725/32; 725/46; 725/136; 725/140; 725/141; 725/142

(58) Field of Classification Search .................. None
See application file for complete search history.

(56) References Cited

U.S. PATENT DOCUMENTS

| 5,929,849 | A | * | 7/1999 | Kikinis ........................ 725/113 |
|---|---|---|---|---|
| 6,029,045 | A | * | 2/2000 | Picco et al. ..................... 725/34 |
| 6,282,713 | B1 | * | 8/2001 | Kitsukawa et al. .............. 725/36 |
| 6,813,776 | B2 | * | 11/2004 | Chernock et al. ............... 725/58 |
| 2002/0083441 | A1 | * | 6/2002 | Flickinger et al. .............. 725/32 |
| 2002/0087978 | A1 | * | 7/2002 | Nicholson et al. .............. 725/34 |
| 2006/0026628 | A1 | * | 2/2006 | Wan et al. ....................... 725/32 |
| 2007/0061838 | A1 | * | 3/2007 | Grubbs et al. .................. 725/35 |
| 2007/0079325 | A1 | * | 4/2007 | de Heer .......................... 725/32 |
| 2007/0113243 | A1 | * | 5/2007 | Brey ............................. 725/32 |
| 2008/0015932 | A1 | * | 1/2008 | Haeuser et al. ................. 705/14 |

FOREIGN PATENT DOCUMENTS

WO      WO 0033233 A1 * 6/2000

OTHER PUBLICATIONS

Emergency Alert System http://www.fcc.gov/pshs/eas/ pp. 1-10, Printed on Oct. 10, 2007.

(Continued)

*Primary Examiner* — Dominic D Saltarelli
*Assistant Examiner* — Jason J Chung
(74) *Attorney, Agent, or Firm* — Weaver Austin Villeneuve & Sampson LLP (57) ABSTRACT

In one embodiment, a Media Analysis and Delivery System obtains a set of media delivery rules, wherein the set of media delivery rules includes one or more triggers, each of the triggers identifying a topic of interest. The Media Analysis and Delivery System examines a media stream for at least one of the one or more triggers in accordance with the set of media delivery rules. The Media Analysis and Delivery System provides at least a portion of the media stream in response to at least one of the triggers in accordance with at least one of the set of media delivery rules.

24 Claims, 7 Drawing Sheets

OTHER PUBLICATIONS

Digital Video Recorder from Wikipedia, the free encyclopedia, http://en.wikipedia.org/wiki/Digital_video_recorder pp. 1-9, Printed on Oct. 10, 2007.

Adelphia Digital Video Recorder (DVR), http://www.adelphia.com/cable_entertainment/dvr.cfm downloaded from the internet on Mar. 27, 2007, 3 pages.

* cited by examiner

FIG. 7

FACILITATING REAL-TIME TRIGGERS IN ASSOCIATION WITH MEDIA STREAMS

BACKGROUND

1. Technical Field

The present disclosure relates generally to technology facilitating real-time triggers in association with media streams.

2. Description of the Related Art

A television station can interrupt its regular programming to broadcast an important news flash. Similarly, an Emergency Alert System may also interrupt the programming of various channels. Unfortunately, if a viewer is not watching that particular television channel, the viewer will be unaware of the broadcast.

A user may also identify a particular program that he or she wishes to view. However, in order for the user to view or record a desired program through the use of a recording device such as a Digital Video Recorder (DVR), the user must typically identify the channel and time of the program in advance. Unfortunately, it is not always easy for a user to identify a program that he or she wishes to view with the limited information that is typically provided in the program description or title. Even if the DVR does record a particular program, the user must search through previously recorded programs on the DVR in order to view the program.

DESCRIPTION OF EXAMPLE EMBODIMENTS

In the following description, numerous specific details are set forth in order to provide a thorough understanding of the disclosed embodiments. It will be obvious, however, to one skilled in the art, that the disclosed embodiments may be practiced without some or all of these specific details. In other instances, well known process steps have not been described in detail in order not to unnecessarily obscure the disclosed embodiments.

Overview

In one embodiment, a Media Analysis and Delivery System obtains a set of media delivery rules, wherein the set of media delivery rules is associated with one or more triggers, each of the triggers identifying a topic of interest. The Media Analysis and Delivery System examines a media stream for at least one of the one or more triggers in accordance with the set of media delivery rules. The Media Analysis and Delivery System provides at least a portion of the media stream in response to at least one of the triggers in accordance with at least one of the set of media delivery rules.

Specific Example Embodiments

Multimedia channels such as television stations (or third-party distributors) transmit media streams in association with corresponding television channels. These media streams can be analog or digital. For instance, television stations or other content providers may transmit digital media streams via a transmission medium or a network such as the Internet. Thus, the term channel may be used to refer to any source of a multimedia stream or video feed.

The disclosed embodiments empower the end-user to select topics of interest for which a media stream or portion thereof is to be captured. As one example, the disclosed embodiments enable the end-user to designate one or more topics for which they would like to be notified. For instance, the end-user could specify those topics that would merit interrupting programs that they watch. A topic of interest may be expressed by what will be referred to in the following description as a "trigger."

In accordance with various embodiments, a set of one or more media delivery rules includes one or more triggers. The set of media delivery rules may be generated by a user or set of users. Each of the set of media delivery rules need not be generated at the same time, or be generated by the same user. A media stream or portion thereof may be "captured" when it includes at least one of the triggers in accordance with the corresponding media delivery rule. Capturing of a media stream or portion thereof may include recording the media stream or portion thereof, buffering the media stream or portion thereof, transmitting the media stream or portion thereof, and/or replacing another media stream with the media stream or portion thereof.

In addition, one or more of the set of media delivery rules may govern the manner in which a media stream or portion thereof is treated when the media stream includes a particular trigger or triggers. More particularly, a media delivery rule may establish the condition(s) under which a media stream is to be provided or recorded when the media stream includes a particular trigger or triggers. For instance, a media delivery rule can designate that a video clip associated with a particular trigger is to be played to interrupt the program being watched, while another media rule can designate that a video clip associated with a particular trigger be recorded instead of interrupting the program being watched. In other embodiments, a default or user-setting (e.g., applying to a set of media delivery rules) may establish the manner in which a media stream or portion thereof is treated when the media stream includes a particular trigger or triggers.

One or more of the set of media delivery rules may also indicate a time period during which a media stream or portion thereof including one or more triggers is to be captured. For instance, the time period may be a half-hour, an hour, or the length of the program including the trigger(s). Alternatively, the time period during which the media stream or portion thereof including the trigger(s) is to be captured may be specified in a user-established setting (e.g., applying to one or more media delivery rules) or may be specified in a default setting.

The set of media delivery rules may also indicate a priority among the media delivery rules (and therefore the corresponding topics of interest). For example, if a media stream is to interrupt the program that the user is currently watching, it may not be possible to provide a media stream associated with more than one of the media delivery rules. In these circumstances, it may be desirable to record further media streams (e.g., associated with different topics of interest) that are to interrupt user programming so that they may be watched by the user at a later time. For instance, the further media streams may be automatically provided to the user during a subsequent program that the user is watching, or may be retrieved by the user at a later time. It may also be desirable to prioritize media streams associated with television stations or channels for handling media streams in the event that trigger(s) associated with the same or different media delivery rules are detected on more than one channel, where the handling of those media streams would conflict. Of course, it is important to note that some systems may accommodate the interruption of programming with more than one media stream (e.g., where the system supports multiple windows).

A trigger may define a topic of interest to a user or set of users. For instance, each user in a household may establish different triggers and/or media delivery rules. The triggers and/or media delivery rules may also be prioritized among the users in a household. For instance, the triggers and media delivery rules of a parent may override those of his or her children.

The Media Analysis and Delivery System may detect a trigger based upon the type of trigger (e.g., image, audio, video, or text). The trigger type can, for example, be textual, image, video, and/or audio. Stated another way, a trigger may include, for example, one or more textual words, one or more images, a video clip, and/or audio (e.g., specific sound(s) or words). For example, a user may enter a word "monkey" to define a trigger, which may be triggered by the textual word "monkey" (e.g., in the form of a caption), an image of a monkey, a video including a monkey, and/or audio including the word monkey or monkey noises. Of course, if the user is only interested in images of monkeys, the user can select the trigger type "image" to the exclusion of other trigger types. Accordingly, the type of trigger may be implicit, or may be selected by the user.

Figure 1:
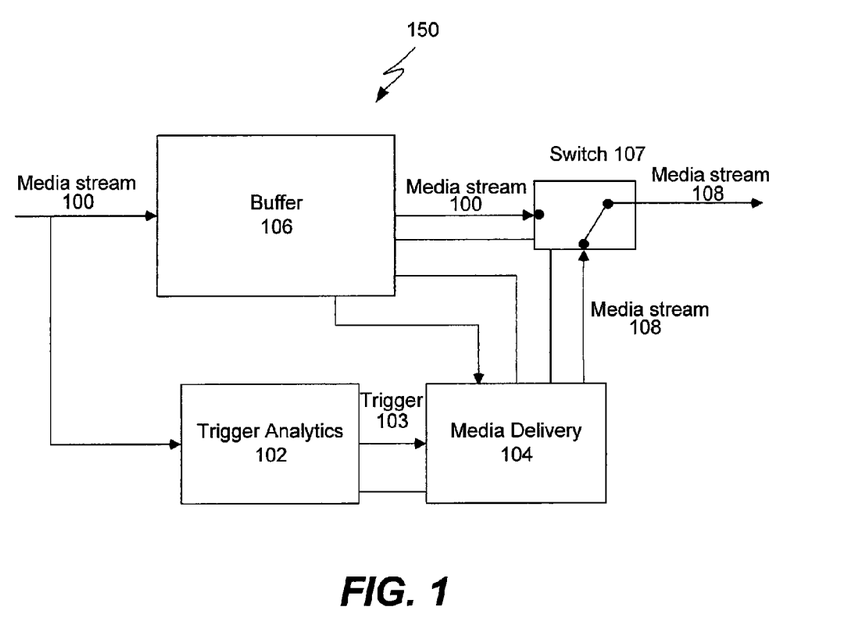
FIG. 1 is an example system for facilitating media delivery in response to triggers.

FIG. 1 is an example Media Analysis and Delivery System 150 for facilitating media delivery in response to triggers. When a media stream 100 is transmitted (e.g., by a multimedia channel such as a television channel), Trigger Analytics 102 may analyze the media stream 100 to determine whether one or more triggers are detected. Upon detection of a particular set of one or more triggers 103, a Media Delivery Module 104 may deliver at least a portion of the media stream in response to the set of triggers in accordance with at least one of a set of media delivery rules. The set of media delivery rules may be stored in a memory (not shown) coupled to the Media Delivery Module 104. Each set of media delivery rules may be represented by a variety of data structures, such as instantiated objects, linked lists, and/or arrays. By the time a trigger is detected, the media stream may have already played past the point of the trigger. Thus, in accordance with one embodiment, a Buffer 106 may buffer the media stream for a period of time as the media stream passes through the Media Delivery Module 104. Thus, when a trigger is detected, the Media Delivery Module 104 may obtain the appropriate portion of the media stream from the Buffer 106, producing media stream 108. In this example, the media stream 100 is interrupted to play the media stream 108 in response to the detected trigger. For instance, a switch 107 may select between the media streams 100 and 108. In this manner, a user watching a multimedia channel (e.g., television channel) may be notified of a topic of interest by receiving a media stream including a particular trigger, even where the media stream 108 is associated with another television multimedia channel. The Media Analysis and Delivery System 150 may include a processor for performing analysis of a media stream, as well as a memory for storing the set of media delivery rules.

In order to receive transmissions via multiple television channels, the Media Analysis and Delivery System 150 may include multiple tuners such that a different tuner may be tuned to each of the television channels. Similarly, the Media Analysis and Delivery System 150 may also include one or more processors to accommodate the analysis of multiple media streams. Of course, the channels need not be television channels. For instance, each of the channels may be associated with Really Simple Syndication (RSS feed). Thus, a single digital media stream may include information associated with one or more channels. As another example, each of the channels may be associated with a Real-Time Transport Protocol (RTP) stream and corresponding session. Since the Media Analysis and Delivery System 150 may merely receive one or more digital media streams, the Media Analysis and Delivery System 150 need not include one or more tuners. One or more of the channels could be control or informational channels which provide information about media channels. For example, a Program Guide may be sent as an RSS feed which is analyzed and scanned to determine the content of one or more TV channels. However, since the Program Guide does not contain media content in itself, the corresponding RSS feed not need be recorded. Rather, the Program Guide RSS feed may be analyzed and scanned to determine the TV channel(s) to be recorded (or otherwise provided). In other words, a first multimedia channel may be analyzed in order to identify a separate set of one or more multimedia channels to be provided or recorded. Accordingly, a set of one or more TV channel(s) to be recorded (or provided) may be identified as a result of analyzing the Program Guide RSS feed.

Figure 2:
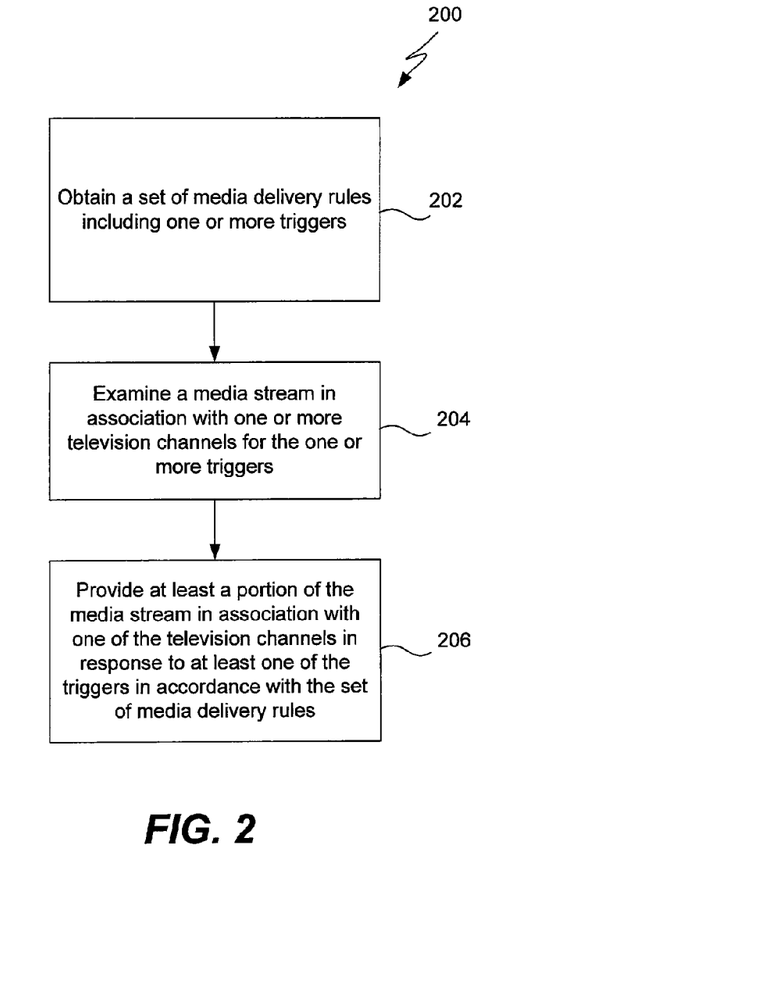
FIG. 2 is an example method of providing media in response to real-time triggers.

FIG. 2 is an example method 200 of providing media in response to real-time triggers. The Media Analysis and Delivery System obtains a set of media delivery rules at 202, where the set of media delivery rules includes one or more triggers associated with these rules. More particularly, the Media Analysis and Delivery System 150 may obtain the set of media delivery rules interactively when established by a user or, alternatively, the Media Analysis and Delivery System may obtain the set of media delivery rules from memory once established by a user (or multiple users). More particularly, each of the set of media delivery rules may include one or more triggers associated with these rules. For instance, a trigger may include the term "weather" or "weather report." As another example, a trigger may be defined by images and/or videos of volcanoes. In this manner, each of the triggers may be associated with a topic of interest. Moreover, a single media delivery rule may include multiple triggers, such as weather reports including images and/or videos of volcanoes. In this example, the phrase "weather report" may be of trigger type "audio," while the term "volcano" may be of trigger type "image" or "video."

Operators such as "AND" or "OR" may be used to associate multiple triggers with a single media delivery rule. For instance, a media delivery rule "weather report" AND "rain" may indicate that both triggers are to be found in order to trigger capturing of the media stream. As another example, a media delivery rule "weather report" OR "weather forecast" may indicate that either of the rules has been satisfied in order to trigger the capturing of the media stream. Thus, if one of the triggers in an "OR" statement is found, a search for the remaining trigger(s) in the "OR" statement need not be performed. Other operators such as "EXCEPT" or "NOT" may identify a trigger that is to be excluded from a media delivery rule. In other words, the media delivery rule is satisfied only when the specified trigger is not found in the media stream.

A user may submit input such that a set of media delivery rules is established. Once established, the set of media delivery rules can be associated with a particular user or set of users. Thus, different sets of media delivery rules may be established for a single household. As a result, priorities among the different sets of media delivery rules may be established. For instance, parental media delivery rules may have a higher priority than their children's media delivery rules. It may also be desirable to apply a set of policies to limit the circumstances under which the portion of the media stream is provided. For instance, parents may limit the content that is delivered in response to a particular trigger. Once the set of media delivery rules is established, one or more of the set of media delivery rules may be obtained and executed, as set forth at 204 and 206.

The Media Analysis and Delivery System may execute the set of media delivery rules by analyzing a media stream in association with one or more television channels for at least one of the one or more triggers in accordance with the set of media delivery rules as shown at 204. The Media Analysis and Delivery System may implement a variety of analytics to examine a media stream. Analytics may generally be defined as the use of algorithms to analyze incoming video feeds in order to detect various events. For instance, text analytics, voice analytics, audio analytics and/or video analytics may be applied to a media stream in order to detect one or more triggers. More particularly, voice or audio analytics may involve converting the voice or audio content to text so that the text can be analyzed in order to detect triggers. Similarly, video analytics may include analyzing video for images, where a trigger includes one or more images. Moreover, the Media Analysis and Delivery System may analyze text transmitted in a media stream. For instance, the Media Analysis and Delivery System may perform character recognition on banners or other captioning information that is transmitted for viewing at the bottom of a television screen.

Upon detection of one or more triggers, the Media Analysis and Delivery System may provide at least a portion of the media stream in association with at least one of the television channels in response to at least one of the triggers in accordance with at least one of the set of media delivery rules at 206. More particularly, once the Media Analysis and Delivery System has identified a portion of a media stream including one or more triggers, the Media Analysis and Delivery system may provide the media stream or a portion thereof. More particularly, a media delivery rule may specify the manner in which the media stream or portion thereof is to be provided to the user in response to a trigger. For instance, the media delivery rule associated with a particular trigger may specify that the media stream or portion thereof be provided in place of the program that the user is currently watching on a particular channel. The media delivery rule may further specify that the program being replaced be recorded (e.g., by a recording device), enabling the user to play a recorded version of the media stream that has been replaced. Alternatively, the media rule may specify that the media stream or portion thereof be recorded, rather than replace a program that the user is watching.

Alternatively, the media delivery rule can specify that the media stream or portion thereof is to be provided via another device (e.g., cell phone, pager, etc.), enabling the user to receive the media stream in real-time. For instance, it may be desirable to provide only the audio signals, such as where the user merely wants to hear a weather report. As another example, it may be desirable to provide a text message or instant message to the user. Audio signals or text may be provided, for example, via a cell phone or other device. In other words, the user can specify a particular cell phone or cell phone number during configuration of user preferences, or in setting up the particular media delivery rule. Thus, the Media Analysis and Delivery System may place a call to the user to alert the user that a topic of interest has been detected. The Media Analysis and Delivery System may also provide further details to the user, such as the topic of interest that was detected, channel(s) on which the topic of interest was detected, and/or the trigger(s) that were detected. Upon receiving a call notifying the user of the topic of interest that has been detected, the user can choose to listen to the audio signals, ignore the call, or record the audio signals to listen to later. Although this example is in relation to a cell phone, it is important to note that a user may be alerted in a variety of ways and using a variety of devices. Moreover, the media stream or portion thereof may be provided via any device or combination of devices, which may include the Media Analysis and Delivery System.

In some circumstances, it may be desirable to provide the portion of the media stream via the channel that the user is currently watching without replacing the program being watched. For instance, the user may be interested only in a textual message (e.g., caption) in the media stream, such as a stock quote or headline caption. The Media Analysis and Delivery System may provide such a textual message, for example, together with the original programming that the user is watching on a particular channel. In other words, the Media Analysis and Delivery System may overlay the textual message over the program that the user is watching. Thus, a media delivery rule may specify that the textual message be played over the program that the user is watching.

Figure 3:
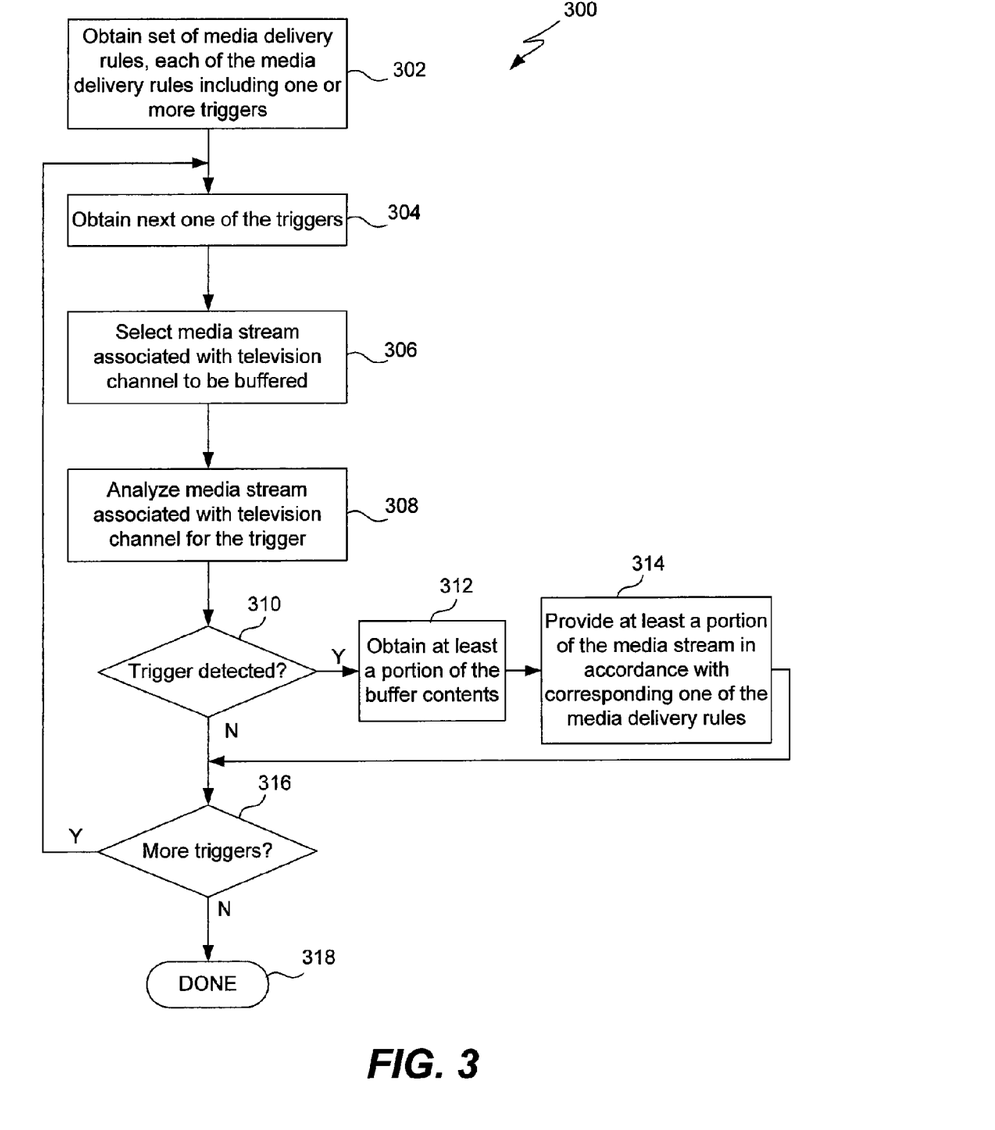
FIG. 3 is another example method of providing a media stream in response to real-time triggers.

FIG. 3 is another example method 300 of providing a media stream in response to real-time triggers. As shown at 302, the Media Analysis and Delivery System 150 obtains a set of media delivery rules, where each of the media delivery rules includes one or more triggers. More particularly, the set of media delivery rules may be obtained from memory, assuming that the set of media delivery rules has already been established by a user or set of users.

The Media Analysis and Delivery System 150 may continuously analyze the media stream associated with one or more channels for the triggers associated with the set of media delivery rules. It is possible that two or more media delivery rules may include the same trigger. For instance, one media delivery rule may include two different triggers, "weather report" and "hurricane," while another media delivery rule may include a single trigger "weather report." Thus, in order to avoid searching for the same trigger in association with multiple media delivery rules, it is possible to sort or track the triggers such that a media stream is searched simultaneously in association with the multiple media delivery rules. In this example, a media stream in association with a television channel may be continuously analyzed for the trigger "weather report" once, even though the trigger is included in two different media delivery rules. (The resulting media stream or portion thereof that includes the trigger "weather report" may be further searched for the second trigger "hurricane" in association with the second media delivery rule.) Alternatively, it is possible to continuously analyze the media for each media delivery rule separately, regardless of duplicative searches for the same trigger(s).

In the following description, the search for each of the triggers is illustrated with respect to one television channel in order to simplify the illustration. However, it is important to note that the process can also be performed with respect to multiple television channels. For instance, the process may be performed in parallel with respect to multiple television channels. If analysis of a media stream results in at least one media rule being satisfied with respect to two or more channels, it is possible to provide the media stream associated with two or more channels simultaneously. For instance, a "composite"

including two or more "windows" may be presented for simultaneous viewing. Similarly, a "composite" may also be recorded in accordance with the disclosed embodiments.

In order to simplify this example, it is assumed that each media delivery rule includes a single trigger. Thus, the Media Analysis and Delivery System obtains a next one of the triggers associated with one of the media delivery rules at 304. The Media Analysis and Delivery System may select the media stream associated with the television channel to be buffered at 306. For instance, the media stream may be buffered for a period of time such that a portion of the media stream is buffered. As the media stream is transmitted in real-time, the Media Analysis and Delivery System may analyze the media stream for the trigger at 308. If the trigger is activated (e.g., detected) at 310, the Media Analysis and Delivery System may obtain at least a portion of the buffer contents at 312. The Media Analysis and Delivery System may then provide at least a portion of the media stream in accordance with the corresponding one of the media delivery rules (e.g., in response to the trigger) at 314. The media stream or portion thereof may be provided in a manner specified in the corresponding media delivery rule, a default setting (e.g., to be applied to one or more of the set of media delivery rules), and/or a user-established setting (e.g., to be applied to one or more of the set of media delivery rules). The process may be repeated for the trigger and/or any remaining triggers associated with the set of media delivery rules at 316 until the process ends at 318.

The above-described process of analyzing the media stream for triggers is described sequentially to simplify the illustration. However, this process may also be performed in parallel to search for multiple triggers. Moreover, as set forth above with respect to FIG. 3, it is assumed that each media delivery rule includes a single trigger. However, the Media Analysis and Delivery System may also search for additional triggers associated with a particular media delivery rule, where the detection of all of the two or more triggers (or the satisfaction of a condition based upon two or more triggers) initiates steps 312 and 314. In addition, since each set of media delivery rules may be associated with a different individual, it is also possible to perform the above-processing with respect to multiple sets of media delivery rules.

Figure 4:
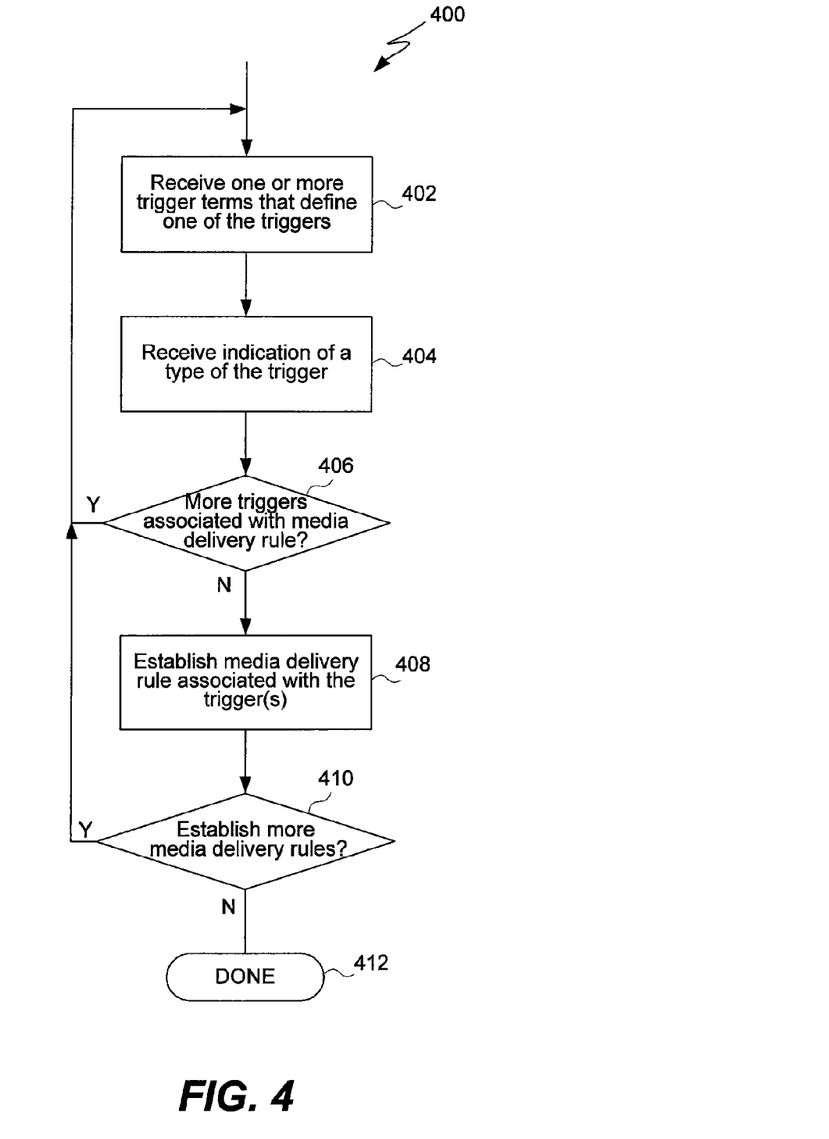
FIG. 4 is an example method of obtaining a set of media delivery rules as shown at 202 of FIG. 2 and 302 of FIG. 3.

FIG. 4 is an example method 400 of obtaining a set of media delivery rules as shown at 202 of FIG. 2 and 302 of FIG. 3. More particularly, a user may enter one or more trigger terms that define one of the triggers at 402. For instance, the user may enter the trigger term(s) via an input device such as a keyboard, remote control device, or via voice recognition software. The user may also enter an indication of a trigger type of the trigger at 404. For instance, the trigger type may be textual, graphic (e.g., including images and/or video), and/or audio (e.g., including words or sounds indicative of the trigger term(s)). The user may indicate the trigger type via a menu or other graphical user interface. If the user wishes to associate more triggers with the media delivery rule at 406, the process may repeat as shown at 402 to obtain the remaining trigger(s). Where two or more triggers are indicated in a single media delivery rule, the user may also indicate a relationship between triggers (e.g., through the use of various operators). The user may establish a media delivery rule associated with the trigger(s) at 408, indicating that the corresponding media stream is to be captured in response to the trigger(s). As set forth above, the media delivery rule may also indicate an action to be performed to provide the captured media stream or portion thereof. For instance, the user may want to record the media stream transmitted by the channel that has been selected by the user, while replacing the media stream transmitted by the channel with at least a portion of the media stream (associated with a different channel) in which at least one of the triggers has been detected. In other words, upon interrupting the channel that has been selected by the user, recording of the media stream transmitted by that channel may be initiated. The media delivery rule may also specify a period of time for which the media stream including the trigger(s) is to be captured. If the user wishes to establish more media delivery rules at 410, the process may repeat at 402. Otherwise, the process ends at 412. As set forth above, different individuals may establish their own individual set of media delivery rules.

As set forth above, each media delivery rule may be associated with one or more individuals. When a media delivery rule is satisfied (in accordance with corresponding trigger(s)), the Media Analysis and Delivery System may interrupt a media stream being transmitted by a first multimedia channel with a media stream associated with a second multimedia channel upon detecting the corresponding triggers in the media stream associated with the second multimedia channel. In accordance with various embodiments, the Media Analysis and Delivery System may be notified of or aware of the individual(s) watching the first multimedia channel. Thus, the Media Analysis and Delivery System may interrupt the first multimedia channel only if all of the individuals associated with the media rule that has been satisfied are actually viewing the first multimedia channel.

The Media Analysis and Delivery System may be notified of the individual(s) watching a particular channel or program via a manual "registration" process. Alternatively, the Media Analysis and Delivery System may "sense" the presence of various individuals using an automated mechanism. For example, a video camera may use an image of the viewers to identify from the image those individuals who are present (e.g., using previously configured photographs of each individual). As another example, the Media Analysis and Delivery System may use a technology such as a finger printing technology on a remote control device or other device to determine whether a particular individual is present.

Figure 5:
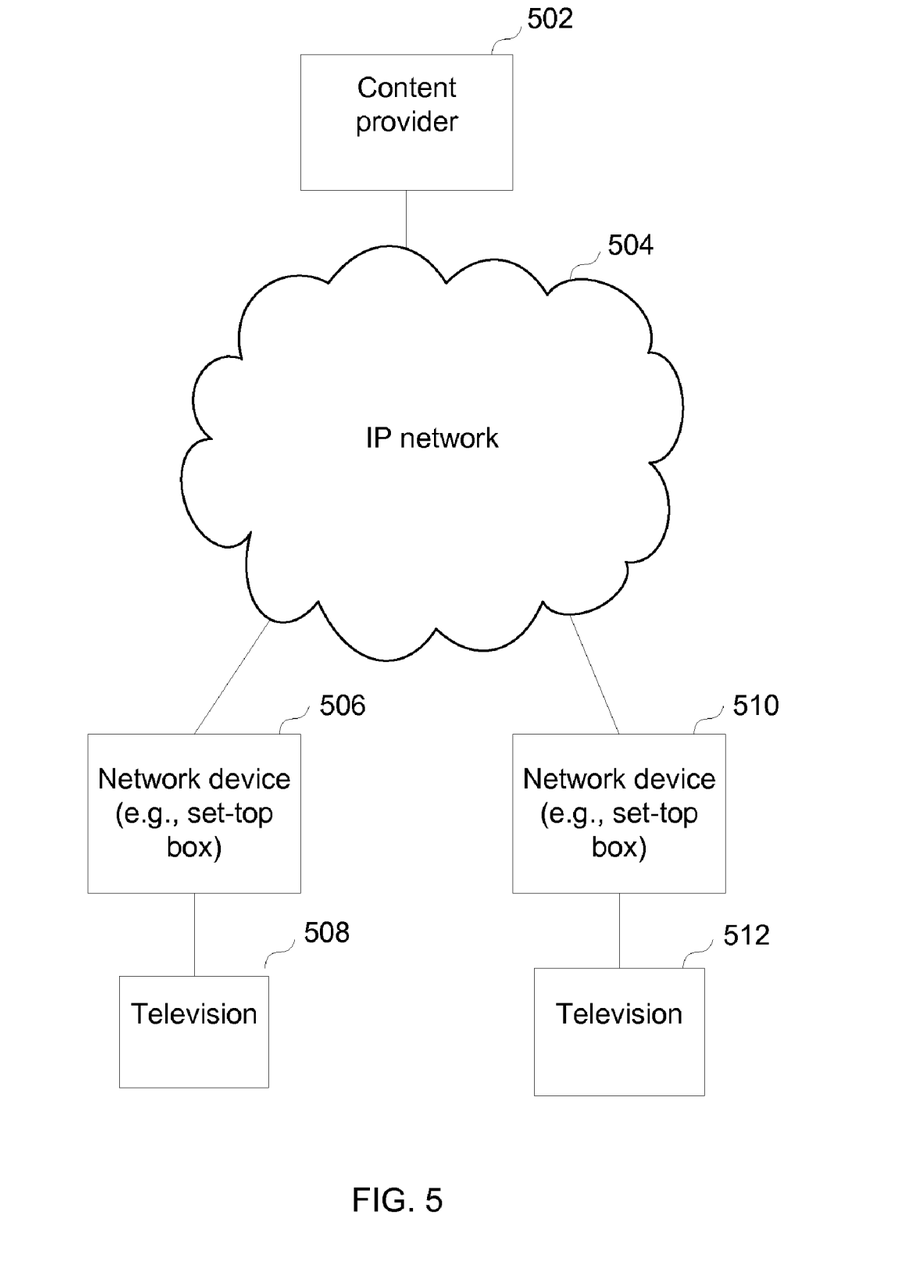
FIG. 5 is another example system for facilitating media delivery in response to triggers.

FIG. 5 is another example system for facilitating media delivery in response to triggers. As shown in this example, a content provider 502 may be coupled to a network 504 (e.g., IP network) such as the Internet. The content provider 502 may be a service provider such as Comcast. More particularly, the content provider 502 may include a head end. The term "head end" may be used to refer to a central distribution point in a broadband data or cable television system. Although not shown, a separate server may be associated with the head end. For instance, such a server may be used to perform analysis on various media streams. The server may then provide at least a portion of one or more of the media streams corresponding to one or more channels to the head end. This may be accomplished by providing multiple media streams to the head end or a single "composite" media stream. As one example, the server may operate as an RSS aggregator, which aggregates RSS feed corresponding to multiple channels into a single RSS feed.

In addition, a plurality of subscribers may be coupled to the network 504. Each subscriber may have an associated network device (including a processor and a memory), such as a set-top box. In this example, a first subscriber may have an associated set-top box 506 and a corresponding display or television 508. Similarly, a second subscriber may have an associated set-top box 510 and a corresponding display or television 512. The network devices 506, 510 may be configured to perform various processes in accordance with various embodiments described herein. Alternatively, the processes may be performed via a server on the network 504 rather than the network devices 506, 510.

In one embodiment, a media delivery rule may be referred to as an event. Analysis of media streams to detect events may be performed via the content provider 502, client devices such as the network devices 506, 510, and/or a server on the network 504. More particularly, when analysis is computation intensive or when multiple clients are likely to be interested in the same event, it may be desirable to perform the analysis at the content provider 502 or associated server on the network. However, when analysis is not computation intensive, it may be desirable to perform the analysis at client devices such as the network devices 506, 510. For instance, when analysis is computation intensive, a client device may notify or request the content provider to perform analysis of the media streams. Of course, the content provider may reject this request, and therefore require that the client perform the analysis locally.

Figure 6A:
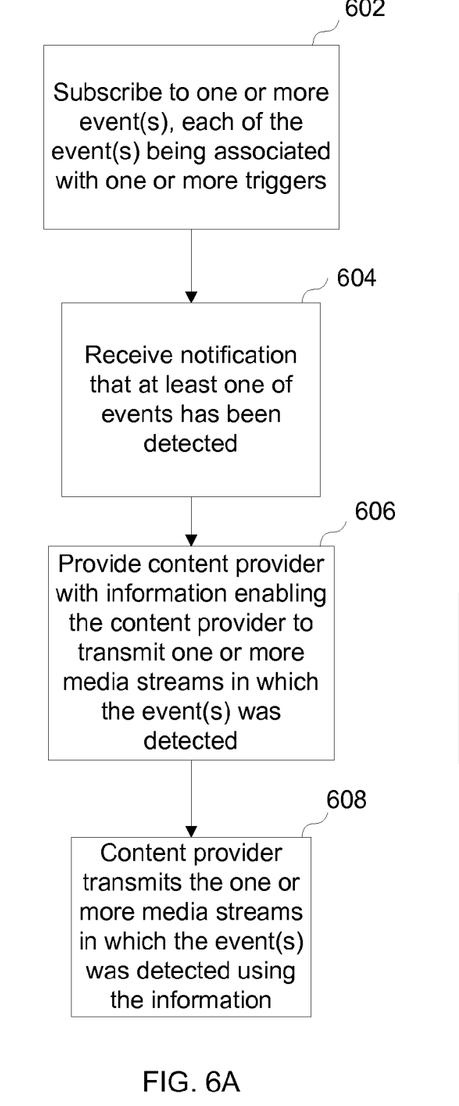
FIGS. 6A-B are additional examples of methods of providing media in response to real-time triggers.
Figure 6B:
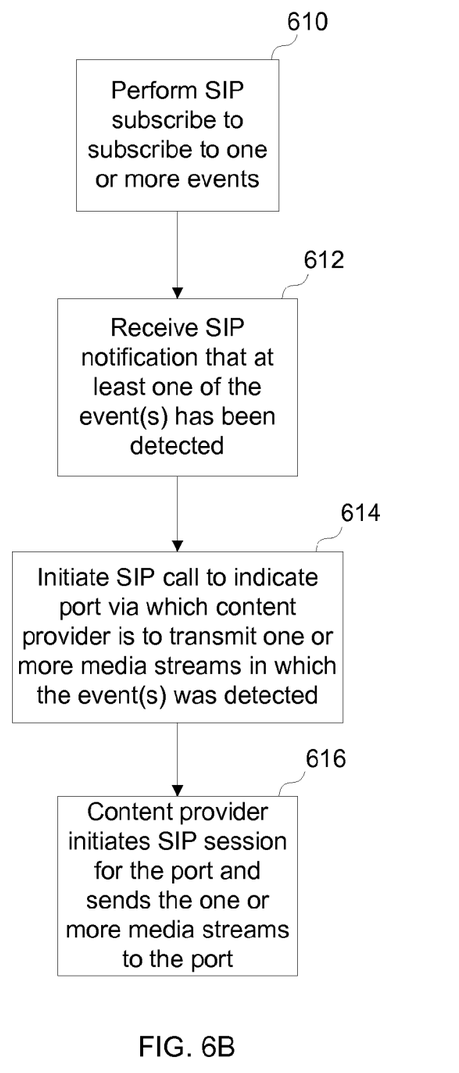

FIGS. 6A-6B together illustrate additional example methods of providing media in response to real-time triggers when analysis of media streams associated with multiple channels is performed by the content provider 502 or associated server. As shown in FIG. 6A, a user (or client device) may subscribe to one or more events at 602, where each event is associated with one or more triggers. When the content provider or other server detects at least one of the event(s) in association with one or more media streams, it may transmit a notification to the client that the event(s) has been detected. When the client (e.g., client device or client server) receives notification that the event(s) has been detected at 604, it may provide the content provider with information enabling the content provider to transmit at least a portion of the media stream(s) in which the event(s) was detected at 606. Of course, the client may provide this information to the content provider upon subscribing to the event(s), rather than in response to a notification. This information may include, for example, a port identifier or channel. The content provider may then transmit the media stream(s) or portion thereof in which at least one of the events was detected using the information at 608. In this manner, the content provider may transmit one or more media streams (or portion thereof) to various clients in accordance with the event(s) to which the clients have subscribed.

FIG. 6B is a process flow diagram illustrating a method of providing media in response to the detection of an event in accordance with the Session Initiation Protocol (SIP). As shown at 610, the client may perform a SIP subscribe to subscribe to one or more events. Upon receiving a SIP notification that at least one of the event(s) has been detected at 612, the client may initiate a SIP call at 614 to indicate a port via which the content provider may transmit one or more media streams in which the event(s) was detected. The content provider may initiate a SIP session for the port and send the one or more media streams to the port at 616. Although the example shown in FIG. 6B is described with reference to SIP, the disclosed embodiments may be implemented using other protocols, such as DOCSIS (Data Over Cable Service Interface Specifications). For instance, the client may send a DOCSIS control message to indicate a channel via which the head end may transmit one or more media streams in which the event(s) was detected.

Generally, the techniques of the disclosed embodiments may be implemented on software and/or hardware. In a specific embodiment, the techniques are implemented in software. Thus, the disclosed embodiments relate to machine-readable media that include program instructions, state information (e.g., tables), etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The disclosed embodiments may also be embodied in or associated with a tangible computer-readable medium in which a carrier wave travels over an appropriate medium such as airwaves, optical lines, electric lines, etc. Examples of program instructions include both machine code, such as produced by a compiler, and files containing higher level code that may be executed by a computer using an interpreter.

Figure 7:
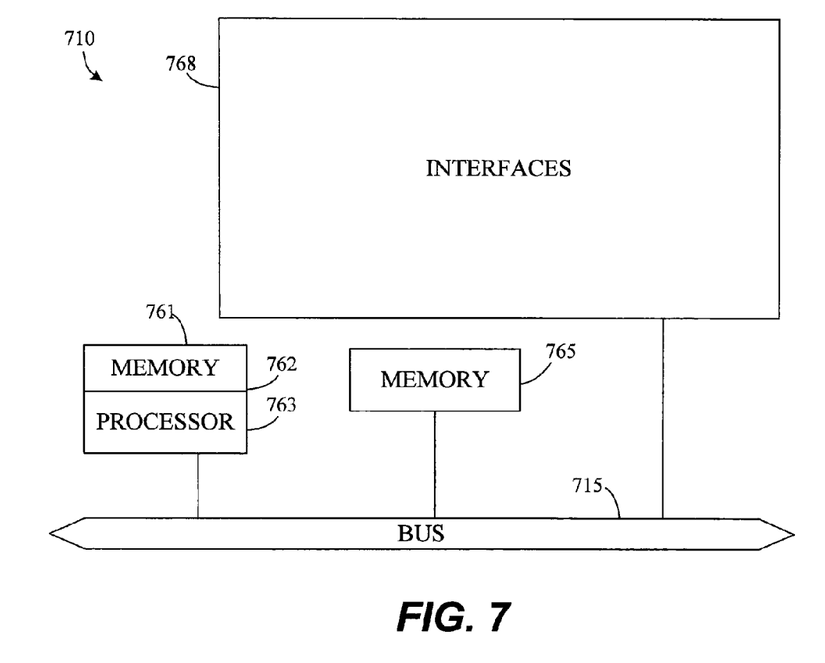
FIG. 7 is a block diagram illustrating an example general-purpose computer system suitable for implementing the disclosed embodiments.

The disclosed embodiments may be implemented on any suitable computer system. FIG. 7 illustrates a typical, general-purpose computer system 710 suitable for implementing the disclosed embodiments. The computer system may take any suitable form. The computer system 710 includes any number of processors 762 (also referred to as central processing units, or CPUs) that may be coupled to memory devices including primary storage device 761 (typically a read only memory, or ROM) and primary storage device 765 (typically a random access memory, or RAM). As is well known in the art, ROM acts to transfer data and instructions uni-directionally to the CPUs 762, while RAM is used typically to transfer data and instructions in a bi-directional manner. Both the primary storage devices 761, 765 may include any suitable computer-readable media.

A secondary storage medium 765, which is typically a mass memory device, may also be coupled bi-directionally to CPUs 762 and provides additional data storage capacity. The mass memory device 765 is a computer-readable medium that may be used to store programs including computer code, data, and the like. Typically, the mass memory device 765 is a storage medium such as a hard disk, which is generally slower than primary storage device(s) 761. Alternatively, the mass memory device 65 may be a storage device such as a SCSI storage device.

The CPUs 710 optionally may be coupled to a computer or telecommunications network, e.g., an internet network or an intranet network, using a network connection as shown generally at 768. With such a network connection, it is contemplated that the CPUs 762 might receive information from the network (e.g., media streams in association with one or more television channels), or might output information to the network (e.g., a portion of a media stream in which a trigger has been detected) in the course of performing the above-described method steps. Thus, data may be transmitted over a network to be processed, or to be stored to or retrieved from a remote storage device. Accordingly, the disclosed embodiments may be installed for use across a network such as a local area network (LAN) or the Internet.

In one embodiment, the disclosed processes may be implemented, in whole or in part, by a network device that is separate from a computer, television, display, or other device via which media streams associated with television channels may be received. For instance, the disclosed embodiments may be implemented, in whole or in part, in a network device such as a set-top box. Alternatively, the disclosed processes may be implemented, in whole or in part, at a server coupled to a network such as a local area network (LAN) or the Internet.

Although the foregoing embodiments have been described in some detail for purposes of clarity of understanding, it will be apparent that certain changes and modifications may be practiced within the scope of the appended claims. For instance, the media stream(s) described above need not be transmitted or associated with one or more television channels. Rather, media streams such as multimedia streams may be received from a variety of sources such as multimedia channels. As another example, the media stream or portion thereof (e.g., audio, video, and/or text) may be provided to one or more devices. These devices need not be limited to a television or other devices described herein. Therefore, the described embodiments should be taken as illustrative and not restrictive, and the described embodiments should not be limited to the details given herein but should be defined by the following claims and their full scope of equivalents.

The invention claimed is:

1. A method, comprising:
obtaining a set of media delivery rules, wherein the set of media delivery rules is associated with one or more triggers, each of the triggers specifying a topic of interest to be identified within media content, wherein each of the triggers is defined by one or more terms, wherein the triggers are user-specified;
automatically determining from media content of a media stream whether the media content of the media stream includes at least one of the one or more triggers in accordance with the set of media delivery rules by ascertaining whether the media content of the media stream includes a set of text, an image, audio or video within the identified topic of interest as defined by at least one of the triggers; and
automatically providing at least a portion of the media stream based upon a result of determining whether the media content of the media stream includes at least one of the one or more triggers in accordance with at least one of the set of media delivery rules, wherein providing at least a portion of the media stream is performed in a manner specified in a user-established setting;
wherein determining whether the media content of the media stream includes at least one of the one or more triggers comprises determining whether the media content of a media stream transmitted by one or more sources includes at least one of the one or more triggers in accordance with the set of media delivery rules;
wherein providing at least a portion of the media stream comprises providing at least a portion of the media stream transmitted by at least one of the sources in response to determining that the media content of the media stream transmitted by one or more sources includes at least one of the triggers in accordance with at least one of the set of media delivery rules;
wherein the triggers include a set of text including one or more words in accordance with at least one of the set of media rules;
wherein determining whether the media content of the media stream includes at least one of the one or more triggers in accordance with the set of media delivery rules comprises determining whether the media content of the media stream includes the set of text in accordance with at least one of the set of media rules and determining whether the media content of the media stream includes audio including sounds or words specified by at least one of the triggers.

2. The method as recited in claim 1, further comprising:
temporarily storing a segment of the media stream in a buffer;
wherein providing at least a portion of the media stream includes obtaining the segment of the media stream from the buffer.

3. The method as recited in claim 1, wherein the set of media delivery rules indicates a priority among the set of media delivery rules.

4. The method as recited in claim 1, wherein the steps of obtaining, providing and determining are performed by a first device, wherein the at least a portion of the media stream that is provided is received by the first device.

5. The method as recited in claim 1, wherein the steps of obtaining, providing and determining are performed by a first device, wherein the at least a portion of the media stream that is provided is received by a second device.

6. The method as recited in claim 1, wherein providing at least a portion of the media stream comprises:
providing at least one of audio signals, video signals or a text message to a device.

7. The method as recited in claim 1, wherein determining whether the media content of a media stream includes at least one of the one or more triggers in accordance with the set of media delivery rules comprises:
applying at least one of voice analytics, video analytics, or character recognition to the media content of the media stream in association with one or more multimedia channels in order to determine whether the media content of the media stream includes at least one of the one or more triggers.

8. The method as recited in claim 1, wherein the triggers include at least one of one or more images of the topic of interest defined by the corresponding trigger, wherein determining whether the media content of the media stream includes at least one of the one or more triggers in accordance with the set of media delivery rules comprises:
determining whether the media content of the media stream includes at least one of the images of the topic of interest defined by the corresponding trigger.

9. The method as recited in claim 1, wherein the set of media delivery rules is associated with a user.

10. The method as recited in claim 1, further comprising:
applying a set of policies to limit circumstances under which the at least a portion of the media stream is provided.

11. The method as recited in claim 1, wherein providing the at least a portion of the media stream comprises:
interrupting a media stream transmitted by a first multimedia channel with the at least a portion of the media stream in response to determining that the media stream includes at least one of the triggers in accordance with at least one of the set of media delivery rules, wherein the at least a portion of the media stream is associated with a second multimedia channel.

12. The method as recited in claim 11, further comprising:
recording the media stream transmitted by the first multimedia channel, wherein recording is performed in response to determining that the media content of the media stream includes at least one of the triggers in accordance with at least one of the set of media delivery rules such that recording the media stream transmitted by the first multimedia channel is initiated when the media stream transmitted by the first multimedia channel is interrupted.

13. The method as recited in claim 1, wherein providing the at least a portion of the media stream comprises:
recording the at least a portion of the media stream in response to determining that the media content of the media stream includes at least one of the triggers in accordance with at least one of the set of media delivery rules.

14. The method as recited in claim 1, further comprising:
sending an alert indicating that a topic of interest has been detected in response to determining that the media content of the media stream includes at least one of the triggers in accordance with at least one of the set of media delivery rules;

wherein the steps of obtaining, analyzing, and providing are performed by a first device, wherein the alert is sent to a second device.

15. The method as recited in claim 1, wherein each of the set of media delivery rules is associated with one or more individuals, and wherein providing the at least a portion of the media stream comprises:
interrupting the media stream transmitted by a first multimedia channel with the at least a portion of the media stream in response to determining that the media content of the media stream includes at least one of the triggers in accordance with at least one of the set of media delivery rules, wherein the at least a portion of the media stream is associated with a second multimedia channel;
wherein interrupting is performed only if the one or more individuals associated with the at least one of the set of media delivery rules are viewing the first multimedia channel.

16. The method as recited in claim 1, wherein obtaining a set of media delivery rules comprises:
receiving input from a user such that at least one of the set of media delivery rules is established.

17. The method as recited in claim 1, wherein determining whether the media content of the media stream includes at least one of the one or more triggers in accordance with the set of media delivery rules comprises:
determining whether the media content of the media stream includes video specified by at least one of the triggers.

18. The method as recited in claim 1, wherein each of the triggers has an associated trigger type indicating whether the one of the triggers is to be used to search for a set of text, an image, audio, or video.

19. The method as recited in claim 1, wherein the terms are user-specified.

20. A non-transitory computer-readable medium storing thereon computer-readable instructions, comprising:
instructions for obtaining a set of media delivery rules, wherein the set of media delivery rules is associated with one or more triggers, each of the triggers specifying a topic of interest to be identified within media content, wherein each of the triggers is defined by one or more terms, wherein the triggers are user-specified;
instructions for automatically determining from media content of a media stream whether the media content of the media stream includes at least one of the one or more triggers in accordance with the set of media delivery rules by ascertaining whether the media content of the media stream includes a set of text, an image, audio or video within the identified topic of interest as defined by at least one of the triggers; and
instructions for automatically providing at least a portion of the media stream based upon a result of determining whether the media content of the media stream includes at least one of the one or more triggers in accordance with at least one of the set of media delivery rules, wherein providing at least a portion of the media stream is performed in a manner specified in a user-established setting;
wherein determining whether the media content of the media stream includes at least one of the one or more triggers comprises determining whether the media content of a media stream transmitted by one or more sources includes at least one of the one or more triggers in accordance with the set of media delivery rules;
wherein providing at least a portion of the media stream comprises providing at least a portion of the media stream transmitted by at least one of the sources in response to determining that the media content of the media stream transmitted by one or more sources includes at least one of the triggers in accordance with at least one of the set of media delivery rules;
wherein the triggers include a set of text including one or more words in accordance with at least one of the set of media rules;
wherein determining whether the media content of the media stream includes at least one of the one or more triggers in accordance with the set of media delivery rules comprises determining whether the media content of the media stream includes the set of text in accordance with at least one of the set of media rules and determining whether the media content of the media stream includes audio including sounds or words specified by at least one of the triggers.

21. An apparatus, comprising:
a processor; and
a memory, at least one of the processor or the memory being adapted for:
obtaining a set of media delivery rules, wherein the set of media delivery rules is associated with one or more triggers, each of the triggers specifying a topic of interest to be identified within media content, wherein each of the triggers is defined by one or more terms, wherein the triggers are user-specified;
automatically determining from media content of a media stream whether the media content of the media stream includes at least one of the one or more triggers in accordance with the set of media delivery rules by ascertaining whether the media content of the media stream includes a set of text, an image, audio or video within the identified topic of interest as defined by at least one of the triggers; and
automatically providing at least a portion of the media stream based upon a result of determining whether the media content of the media stream includes at least one of the one or more triggers in accordance with at least one of the set of media delivery rules, wherein providing at least a portion of the media stream is performed in a manner specified in a user-established setting;
wherein determining whether the media content of the media stream includes at least one of the one or more triggers comprises determining whether the media content of a media stream transmitted by one or more sources includes at least one of the one or more triggers in accordance with the set of media delivery rules;
wherein providing at least a portion of the media stream comprises providing at least a portion of the media stream transmitted by at least one of the sources in response to determining that the media content of the media stream transmitted by one or more sources includes at least one of the triggers inaccordance with at least one of the set of media delivery rules;
wherein the triggers include a set of text including one or more words inaccordance with at least one of the set of media rules;
wherein determining whether the media content of the media streamincludes at least one of the one or more triggers in accordance with the set ofmedia delivery rules comprises determining whether the media content of themedia stream includes the set of text in accordance with at least one of the set ofmedia rules and determining whether the media content of the media streamincludes audio including sounds or words specified by at least one of the triggers.

22. The apparatus as recited in claim 21, at least one of the processor or the memory being further adapted for:
   receiving a notification that at least one of the triggers has been detected.

23. The apparatus as recited in claim 21, at least one of the processor or the memory being adapted for:
   obtaining information identifying a location to which at least a portion of a media stream is to be provided.

24. The apparatus as recited in claim 21, at least one of the processor or the memory being further adapted for:
   sending a notification indicating that at least one of the triggers has been detected.

\* \* \* \* \*